US007947091B2

(12) United States Patent
Arkles

(10) Patent No.: US 7,947,091 B2
(45) Date of Patent: May 24, 2011

(54) CURCUMIN AND ITS DERIVATIVES FOR USE AS SILICONE COLORANTS

(76) Inventor: Barry C. Arkles, Dersher, PA (US)

(*) Notice: Subject to any disclaimer, the term of this patent is extended or adjusted under 35 U.S.C. 154(b) by 65 days.

(21) Appl. No.: 11/712,625

(22) Filed: Mar. 1, 2007

(65) Prior Publication Data
US 2007/0204412 A1 Sep. 6, 2007

Related U.S. Application Data

(60) Provisional application No. 60/777,790, filed on Mar. 1, 2006.

(51) Int. Cl.
*C09B 69/00* (2006.01)
(52) U.S. Cl. .................... 8/647; 8/672; 8/674
(58) Field of Classification Search ............ 8/637.1, 8/646, 647, 680, 672, 674
See application file for complete search history.

(56) References Cited

U.S. PATENT DOCUMENTS

| 5,439,785 | A | 8/1995 | Boston et al. |
| 5,742,119 | A | 4/1998 | Aben et al. |
| 6,277,881 | B1 | 8/2001 | Santhanam et al. |
| 2003/0095935 | A1* | 5/2003 | Chaiyawat et al. ............ 424/63 |
| 2003/0232288 | A1 | 12/2003 | Oka et al. |
| 2004/0012663 | A1 | 1/2004 | Takashima et al. |
| 2005/0008588 | A1* | 1/2005 | Candau et al. ................. 424/59 |
| 2005/0084224 | A1 | 4/2005 | Greer et al. |

OTHER PUBLICATIONS

STIC Search Report dated Dec. 4, 2008.*

* cited by examiner

*Primary Examiner* — Eisa B Elhilo
(74) *Attorney, Agent, or Firm* — Flaster/Greenberg P.C.

(57) ABSTRACT

Colored silicone polymers and elastomers are described herein wherein the colorants used in the composition provide tint to the polymer, but are capable of retaining transparency of the substrate if desired. The colorants include curcumin and/or a derivative thereof.

9 Claims, 1 Drawing Sheet

CURCUMIN AND ITS DERIVATIVES FOR USE AS SILICONE COLORANTS

CROSS-REFERENCE TO RELATED APPLICATIONS

This application claims the benefit under 35 U.S.C. 119(e) of U.S. Provisional Patent Application No. 60/777,790, filed on Mar. 1, 2006.

BACKGROUND OF THE INVENTION

Silicones and siliceous surfaces have a broad range of applications in medical and diagnostic devices as well as instrumentation and sensors. In many applications, transparency must be maintained for functional performance, but inclusion of a dye is at the same time desirable for either locating the device or filtering unwanted wavelengths of light. One example of such a use is in the application of silicone elastomer for use in forming contact lenses. In order to find the location of the device and/or the device edge, it is useful to have coloration, but the device must still substantially remain transparent. Most dyes are not soluble in silicones or, if soluble in silicones, have undesirable physiological properties.

Thus, there remains a need in the art for suitable dyes for silicone-based materials, including silicone polymers and elastomers that allow for some coloration while allowing the materials to retain their transparency.

BRIEF SUMMARY OF THE INVENTION

The invention includes a silicone-based composition comprising a silicone and a colorant, wherein the colorant comprises curcumin or a derivative thereof.

The invention further includes a method of coloring a silicone, comprising providing to a silicone a colorant comprising curcumin or a derivative thereof.

A dye useful for coloring a silicone is also described herein, wherein the dye is curcumin or a derivative thereof and the dye is at least partially soluble in the silicone.

Also disclosed herein is a method of coloring a siliceous surface, comprising applying to a siliceous surface a colorant comprising curcumin and/or a derivative thereof; and reacting an end group of the curcumin and/or derivative thereof with silicon atoms in the surface to thereby incorporate the colorant in the substrate surface.

The composition of the present invention is formed by polymerizing at least one monomer having the following formula (II):

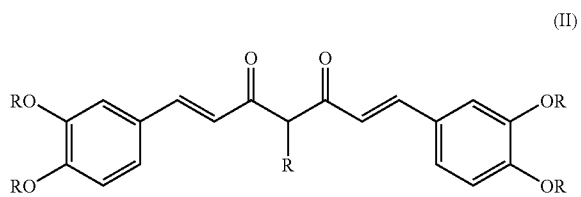

(II)

wherein R is independently selected from the group consisting of hydrogen and branched and straight chain, substituted and unsubstituted groups selected from alkyl, alkenyl, alkoxy and alkenoxy groups of from 1 to about 5 carbon atoms, silane and siloxy groups of from 1 to about 15 carbon and/or silicon atoms in the primary chain, and alkoxysilane and alkenoxysilane groups of from 1 to about 15 carbon and/or silicon atoms in the primary chain.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings an embodiment that is presently preferred. It should be understood, however, that the invention is not limited to the precise arrangement as shown.

In the drawings.

DETAILED DESCRIPTION OF THE INVENTION

Figure 1:
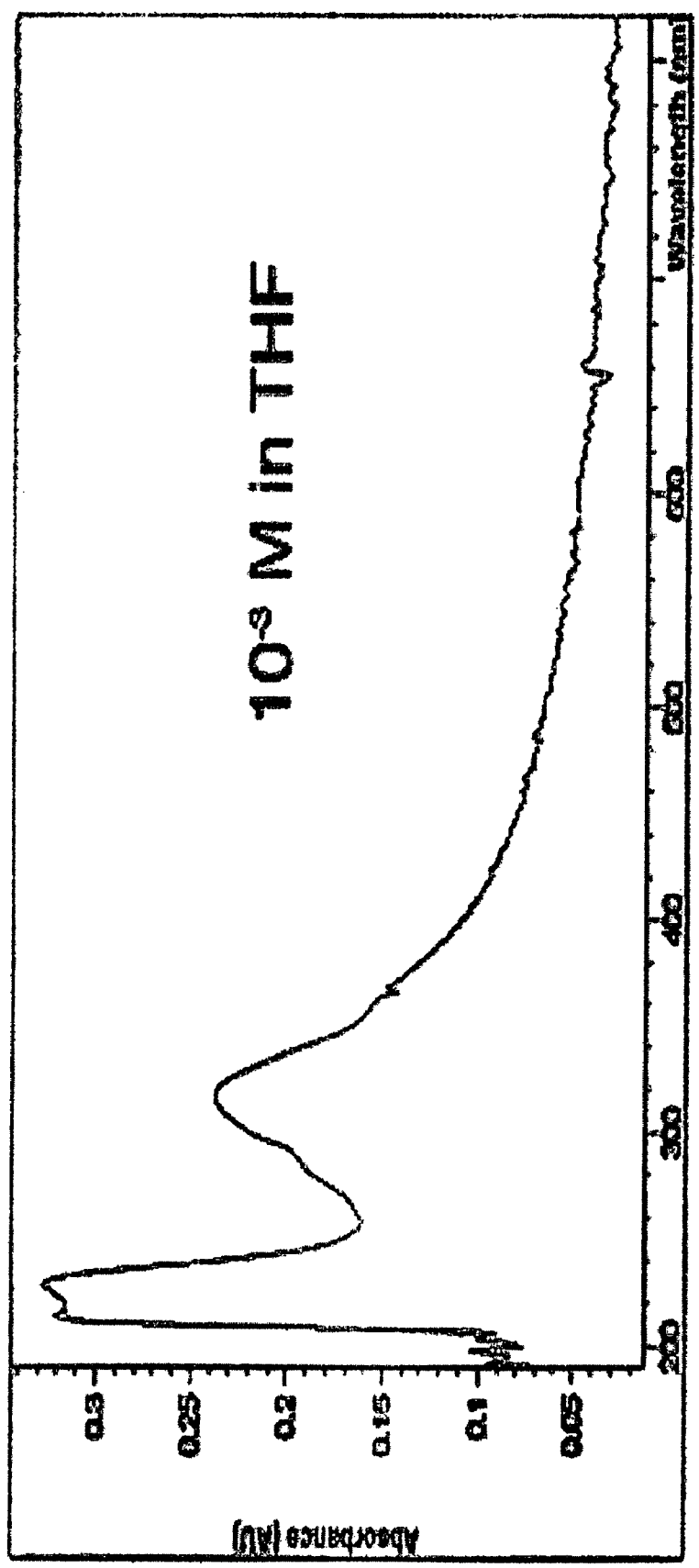
FIG. 1 is a representation of a spectrum of the product formed in Example 1 herein.

Curcumin is the principal chromophore of turmeric, a common food seasoning with a bright yellow-orange coloration. The nominal structure of curcumin is depicted below in formula (I):

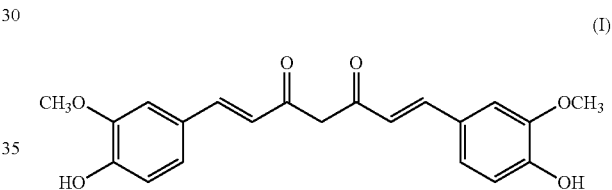

(I)

Curcumin is actually a mixture of products in which the phenolic hydroxyls have formed an average of two methyl ethers as shown above in the nominal structure. Both the number and position of the methyl ethers varies in the natural product, which is a mixture of its keto- and enol-isomers. Curcumin occurs naturally with other isomers and analogs of its structure as noted, and is commonly purified to only about 75% to about 85% of the drawn structures with variations including the position and extent of methoxylation of phenolic hydroxyls.

The present invention includes the various natural forms of curcumin and derivatives of the curcumin structure described above. In the derivatives, preferably all of the remaining hydrogens of the phenolic hydroxyls are replaced by organic radicals that serve to introduce silane substituents. In the preferred embodiment, two other phenolic groups form ether bridges to a silicon atom that is bound either to other silicon atoms through a siloxane bond or to simple hydrocarbons by oxygen (i.e. alkoxy groups). In still other embodiments of the invention, only one of the phenolic hydroxyls is converted to a bridge to a silicon. The remaining phenolic hydroxyls either remain as free hydroxyls or are converted to other non-functional ethers such as methoxy or other alkoxy groups.

The present invention thus includes curcumin as noted above as well as derivatives (including various reaction co-polymers) as represented by the following formula (II) and as described further herein:

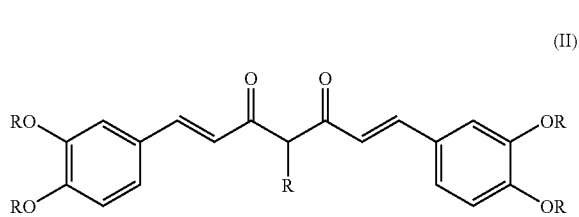

(II)

wherein R is preferably a hydrogen or a branched or straight chain group such as an alkyl or alkoxy group of from 1 to about 5 carbon atoms, or may be reacted or substituted to form a siloxy group or an alkoxysilane group having from 1 to about 15 carbon and/or silicon atoms in the primary chain. Suitable alkoxy groups may be substituted or unsubstituted. As used here, "substitutions" as used herein, unless otherwise specified, may be functionalized atoms or other groups, including, without limitation, halogenated groups, silicon- and siloxane-based groups, carboxy groups, metal-containing groups and salts thereof. Most preferably, R is a short chain alkyl group including, for example, methoxy, ethoxy, isopropoxy, propoxy and butoxy groups.

Most preferably, in a derivative form, at least one or two R groups are hydrogen with at least one to three other R groups being an alkoxysilane having at least one ether linkage, which may be the O (oxygen atom) already bound to the structure or a further ether linkage, such as $-(CH_2)_3Si(CH_3)(OSi(CH_3)_3)_2$ and $-(CH_2)_3Si(C_2H_5O)_3$.

Experimentation has established that co-products can form as well as a preferred structure in which the R group on the fourth carbon in not hydrogen. The co-products are formed during the allylation reaction of the curcumin by substitution of the active methylene between the two ketone groups. The consequence is that apart from the preferred structure in which the fourth carbon is hydrogen, the silyl substituted or unsubstituted allylic groups may form as R groups on the fourth carbon as well.

In one embodiment of this invention, a derivative of curcumin as noted above in Formula (I) is formed in which the polar hydroxyl groups in formula (I) are converted to ether linkages as noted above with respect to formula (II), such that the linkages connect to siloxane groups as shown below in formula (III):

atoms, silane and siloxy groups of from 1 to about 15 carbon and/or silicon atoms in the primary chain, and alkoxysilane and alkenoxysilane groups of from 1 to about 15 carbon and/or silicon atoms in the primary chain.

In another embodiment, similar to that of Formula (III) noted above, such ether linkages are instead connected to alkoxy-substituted silicon atoms that can be hydrolyzed and/or condensed with silanol groups present on an inorganic siliceous substrate and/or cured into silicone resins. This illustration in Formula (IV) below in which R is as noted above with reference to Formula (III).

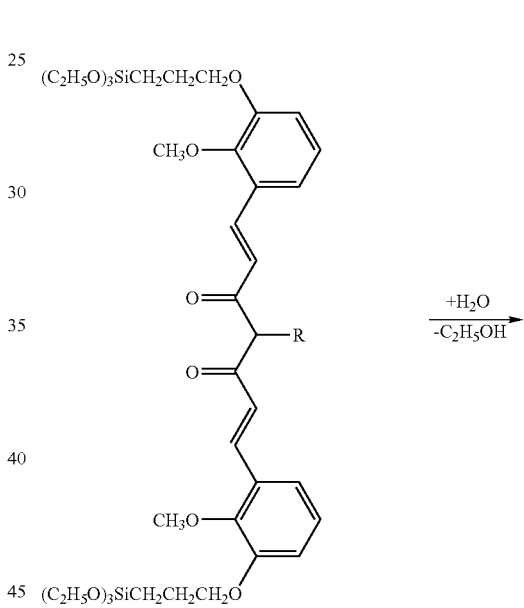

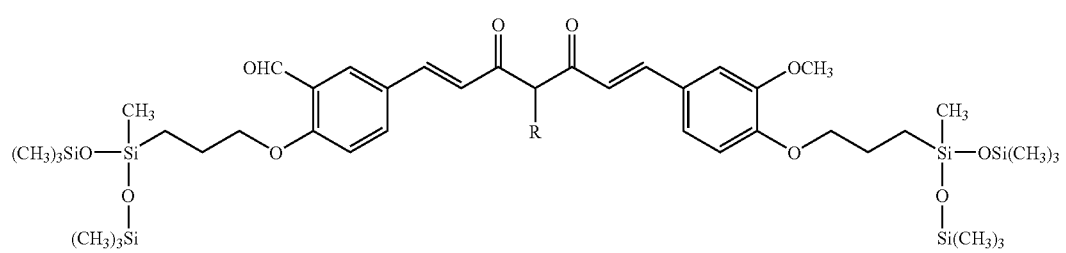

(III)

wherein R is as noted above and includes a preferred group which is hydrogen and other allylated derivate groups including alkanes and substituted and unsubstituted alkyl, alkenyl, alkoxy and alkenoxy groups of from 1 to about 5 carbon

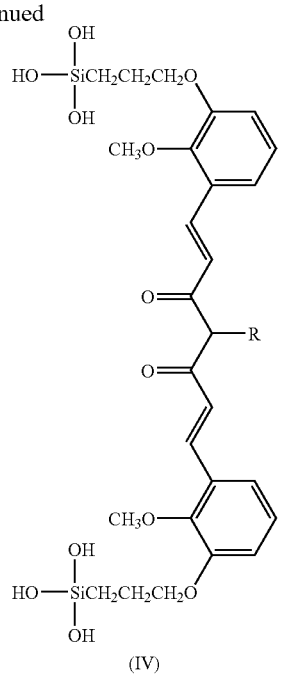

(IV)

Thus, the invention further includes the colorants noted above as well as reaction products of those colorants with siliceous substrates and/or polymerized products of such materials. In reacting the colorants, it is preferred that reactive end groups are provided which are capable of reacting with silicon atoms in the siliceous substrate surface to provide a color to the surface. In addition, the colorants may be polymerized along the surface to provide a colored layer thereto. Finally, the colored silicon-bearing molecules may themselves be polymerized to form silicone-based polymers and elastomers (if crosslinked and cured) that incorporate the color from the curcumin and/or its derivatives therein.

In providing a colorant according to the present invention, which incorporates curcumin and/or a derivative thereof as an active colorant, to a silicone polymer or elastomer, the colorant may be added during any silicone and/or silicone elastomer polymerization step or admixed with the polymer after polymerization. In elastomers, it is preferred, but not necessary, that the colorant be added to the elastomeric composition prior to curing.

Exemplary silicone polymers and/or elastomers that may benefit from the colorants noted herein, include but are not limited to silicone polymers formed from emulsion and/or condensation polymerization among others and are not limited to the technique with which the polymer is made. Further, it is contemplated that the silicone polymer and/or elastomer (if the polymer is cross-linked and cured to form an elastomer) having colorants according to the invention incorporated therein, may be co-polymerized with other various co-monomers or polymers such as other thermoplastic materials, polyurethanes, polycarbonates, polyamides, polyesters, polyolefins, polyethers, polyetherimides, polysulfones, polyarylene ethers, polymethyl metacrylates, polymethacrylic acid, polymethacrylates and the like. Exemplary silicone polymers include polyorganosiloxanes, polydiorganosiloxanes, polyalkylmethylsiloxanes, polyaminopropylsiloxanes, addition-cured polydimethylsiloxanes, poly(dimethyl-diphenyl)siloxanes, polyorganofluorosiloxanes and the like.

The curcumin and/or derivative thereof (wherein the derivatives include the various co-producucts noted above) as used in the colorants of the present invention are at least partially and are preferably substantially or completely soluble in the silicone polymer and/or elastomer with which they are used. The curcumin and/or derivatives thereof are soluble in a great number of silicones such that the choices of polymers and elastomers may be quite diverse. The amount of curcumin and/or derivative added within the colorant and within the composition may vary depending upon the desired end coloring effect and/or physical properties of the polymer as well as the extent of solubility of the curcumin and/or its derivatives within the silicone polymer or elastomer in the composition. Preferably, however, there is about 0.001 to about 5 weight percentage curcumin and/or its derivatives (collectively) based on the weight of the base silicone polymer in the composition, and more preferably about 0.01 to about 2 weight percent.

The resulting compositions, may include other additives normally used with such polymers, depending on the intended end use, including but not limited to fillers, reinforcing agents, thixotropic agents, curatives, catalysts, accelerators, other colorants and pigments, oils, stabilizers, preservatives, flame retardants, UV stabilizers and absorbers, processing aids and the like. It is preferred that such additives make up no more than about 75% by weight of the polymer composition, however, the amount and nature of such additives will necessarily vary depending on the particular polymer or elastomer (and its properties) as well as the intended end use.

The colorants of the invention include at least in part the curcumin and/or a derivative thereof, whether used as a single component or mixture of such components. In addition, in a mixture with the one or more curcumin and/or derivative component(s), it is within the scope of the invention that other colorants, pigments or additives may be incorporated therein to provide different end effects and appearances, as well as to adjust physical or other light properties of the compositions in some cases, such that the resulting color of the composition may be substantially that of the curcumin and/or its derivatives or may be a modified color. For example, in using the curcumin and/or its derivatives to help provide a light tint to silicone-based polymers in contact lens, it is within the scope of the invention that existing contact lens dyes of the same or different colors may be used both for mere identification of the lens against a background or for providing cosmetic effects.

EXAMPLE 1

A 2-liter, 4-neck flask was equipped with a mechanical stirrer, pot thermometer, condenser and an addition funnel. The flask was charged with 50 g (0.136M) of curcumin and 177 ml of ethanol. Sodium ethoxide (0.306M) as a 21% solution in ethanol was added rapidly. The mixture was heated to 50° C.-60° C. for 2 hours. Allyl bromide (37.02 g, 0.306 mol) was added and the mixture heated to reflux (70° C.-75° C.) for 20 hours. The mixture was allowed to return to room temperature and 500 ml of water were added, followed by 177.4 ml of toluene and ca. 10 ml of 38% aqueous hydrochloric acid. The organic layer was separated and washed with 500 ml of water. Volatiles were removed from the organic layer by rotary evaporation at 80° C. and at 2 mmHg to give 50 g of allyl ether intermediate. The intermediate consisted primarily of 1,7bis(4-allyloxy-3-methoxyphenyl)-1,6-heptadiene-3,5-dione and isomers as well as a small portion of triallylated product, 1,7bis(4-allyloxy-3-methoxyphenyl1)-4-allyl-1,6-heptadiene-3,5-dione.

A 500 ml, 3-neck flask was equipped with a magnetic stirrer, pot thermometer, condenser and an addition funnel. The intermediate and 159 g of toluene were charged to the flask and then heated to 85° C.-90° C. Bis(trimethylsiloxy)methylsilane (80 g, 0.271M) was added in two portions. First 30 ml were added rapidly followed by 1 ml of Karstedt platinum complex. A mild exotherm, 5° C.-8° C. was observed. The balance of the bis(trimethylsiloxy)methylsilane was added at a pot temperature of 85° C.-105° C. Two additional portions of Pt catalyst were added during and after the addition. The mixture was maintained at 90° C.-100° C. for 1.5 hours. All volatile components of the reaction mixture were removed by rotary evaporation (80° C. at 2 mmHg). FTIR and NMR of the non-volatile component were consistent with the proposed structure of bis(heptamethyltrisiloxanylpropyl)curcumin. UV max: 220, 232(s), 354(broad). The spectrum is shown in FIG. 1.

The product formed a 20 percent by weight solution in vinyl-terminated (3% diphenylsiloxane)-(97% dimethylsiloxane) copolymer. The product was not soluble in water.

EXAMPLE 2

Under conditions similar to those of Example 1, triethoxysilane was substituted for bis(trimethylsiloxy)methylsilane. The resultant bis(triethoxysilyl)propyl analog was formed.

EXAMPLE 3

A 2 liter neck flask was equipped with a mechanical stirrer, pot thermometer, condenser and an additional funnel. The flask was charged with 50 g (0.136M) of curcumin and 177 mls of ethanol. Sodium ethoxide (0.475M) as a 21% solution in ethanol was added rapidly. The mixture was heated to 50° C.-60° C. for 2 hours. Allyl bromide (57.47 g, 0.475 moles) was added and the mixture heated to reflux (70-75°) for 20 hours. The mixture was allowed to return to room temperature and 500 mls of water was added, followed by 177.4 mls of toluene and ca 10 mls of 38% aqueous hydrochloric acid. The organic layer was separated and washed with 500 mls of water. The volatiles were removed from the organic layer by rotary evaporation at 80° C. and 2 mm Hg to give approximately 80 g of allyl ether intermediate. The intermediate consisted primarily of 1,7bis(4-allyloxy-3-methoxyphenyl)-4-allyl-1,6-heptadiene-3,5-dione as well as a small portion of 1,7bis(4-allyloxy-3-methoxyphenyl)-1,6-heptadiene-3,5-dione and isomers.

The allylated intermediate from above and 150 g of toluene was charged into a 500 ml flask equipped with a magnetic stirrer, pot thermometer, addition funnel and condenser and heated to 85° C.-90° C. Triethoxysilane (50 g, 0.31M) was added in two portions. First 30 mls was added rapidly followed by 1 ml of Karstedt platinum complex. A mild exotherm, 5° C.-10° C. was observed. The balance of the triethoxysilane was added at the pot temperature of 85° C.-105° C. in 30 minutes. Two additional portions of Pt catalyst were added during and after the addition. The mixture was maintained at 90° C.-100° C. for 1.5 hours. All volatiles were stripped at a pot temperature of 80° C. at 2 mm for 2 hours to give 103 g of a dark red viscous product mixture consisting primarily of 1,7bis(4-triethoxysilylpropoxy-3-methoxyphenyl1)-4-triethoxysilylpropyl1-1,6-heptadiene-3,5-dione and 1,7bis(4-triethoxysilylpropoxyoxy-3-methoxyphenyl1)-1,6-hepradiene-3,5-dione, and small amounts of 1,7bis(4-triethoxysilylpropoxy-3-methoxyphenyl1)-4-allyl-1,6-heptadiene-3,5-dione and other isomers. The viscosity of the mixture was 200-500 cSt. FTIR: 1078 vs; 1HNMR consistent. In this example, the reaction is driven to make primarily the trissilylated compound.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:
1. A method of coloring a siliceous surface, comprising applying to a siliceous surface a colorant comprising curcumin and/or a derivative thereof;
reacting an end group of the curcumin and/or derivative thereof with silicon atoms in the surface to thereby incorporate the colorant in the substrate surface.
2. The method according to claim 1, wherein the curcumin and/or a derivative thereof is polymerized along the substrate surface forming a colored layer thereon.
3. The method of claim 1, wherein the curcumin and/or a derivative thereof is represented by the Formula(III):

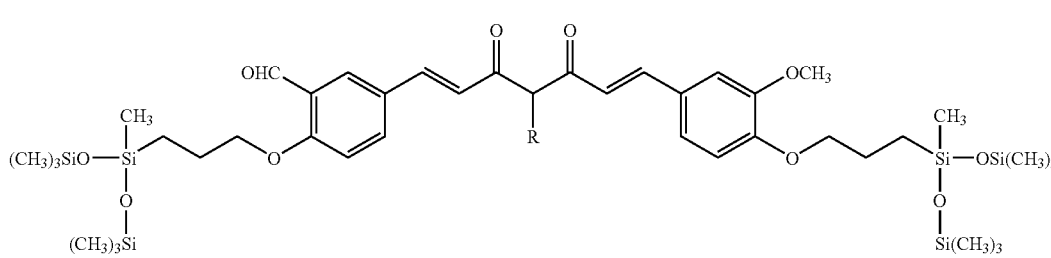

wherein R is independently selected from the group consisting of a hydrogen atom and branched and straight chain, substituted and unsubstituted groups selected from alkyl, alkenyl, alkoxy and alkenoxy groups of 1 to 5 carbon atoms, silane and siloxy groups of 1 to 15 carbon and/or silicon atoms in the primary chain, and alkoxysilane and alkenoxysilane groups of 1 to about 15 carbon and/or silicon atoms in the primary chain.

4. The method of claim 3, wherein at least one R is selected from the group consisting of silane and siloxy groups of 1 to 15 carbon and/or silicon atoms in the primary chain, and alkoxysilane and alkenoxysilane groups of 1 to about 15 carbon and/or silicon atoms in the primary chain.

5. A silicone-based composition, comprising a silicone and a colorant, wherein the colorant comprises a compound represented by Formula (II):

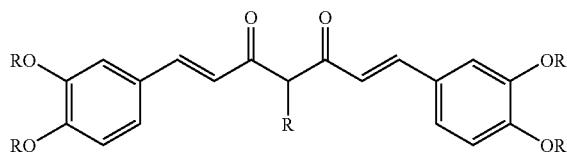

(II)

wherein R is independently selected from the group consisting of branched and straight chain, substituted and unsubstituted groups selected from alkyl, alkenyl, alkoxy and alkenoxy groups of from 1 to about 5 carbon atoms, silane and siloxy groups of from 1 to about 15 carbon and/or silicon atoms in the primary chain, and alkoxysilane and alkenoxysilane groups of from 1 to about 15 carbon and/or silicon atoms in the primary chain.

6. The composition of claim 5, wherein the silicone is an elastomer.

7. A silicone-based composition, comprising a silicone and a colorant, wherein the colorant comprises a compound represented by Formula (II):

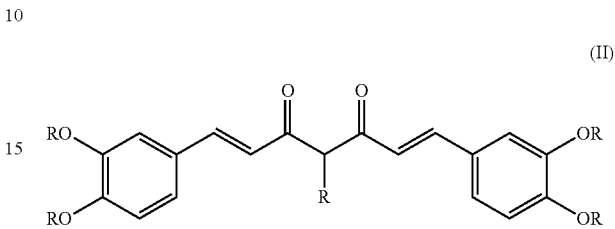

(II)

wherein at least one to three of the groups represented by R is independently selected from an alkoxysilane having at least one ether linkage and the remaining R group(s) are independently selected from a hydrogen atom and branched and straight chain, substituted and unsubstituted groups selected from alkyl, alkenyl, alkoxy and alkenoxy groups of 1 to 5 carbon atoms, silane and siloxy groups of 1 to 15 carbon and/or silicon atoms in the primary chain, and alkoxysilane and alkenoxysilane groups of 1 to about 15 carbon and/or silicon atoms in the primary chain.

8. The composition of claim 7, wherein R is selected from a methoxy, an ethoxy, an isopropoxy, a propoxy, and a butoxy.

9. The composition of claim 7, wherein the silicone is an elastomer.

* * * * *